No. 869,092. PATENTED OCT. 22, 1907.
J. P. KARR & J. D. RAUCH.
BOOM AND ROTATABLE CIRCLE FOR EXCAVATORS.
APPLICATION FILED FEB. 12, 1907.
2 SHEETS—SHEET 1.
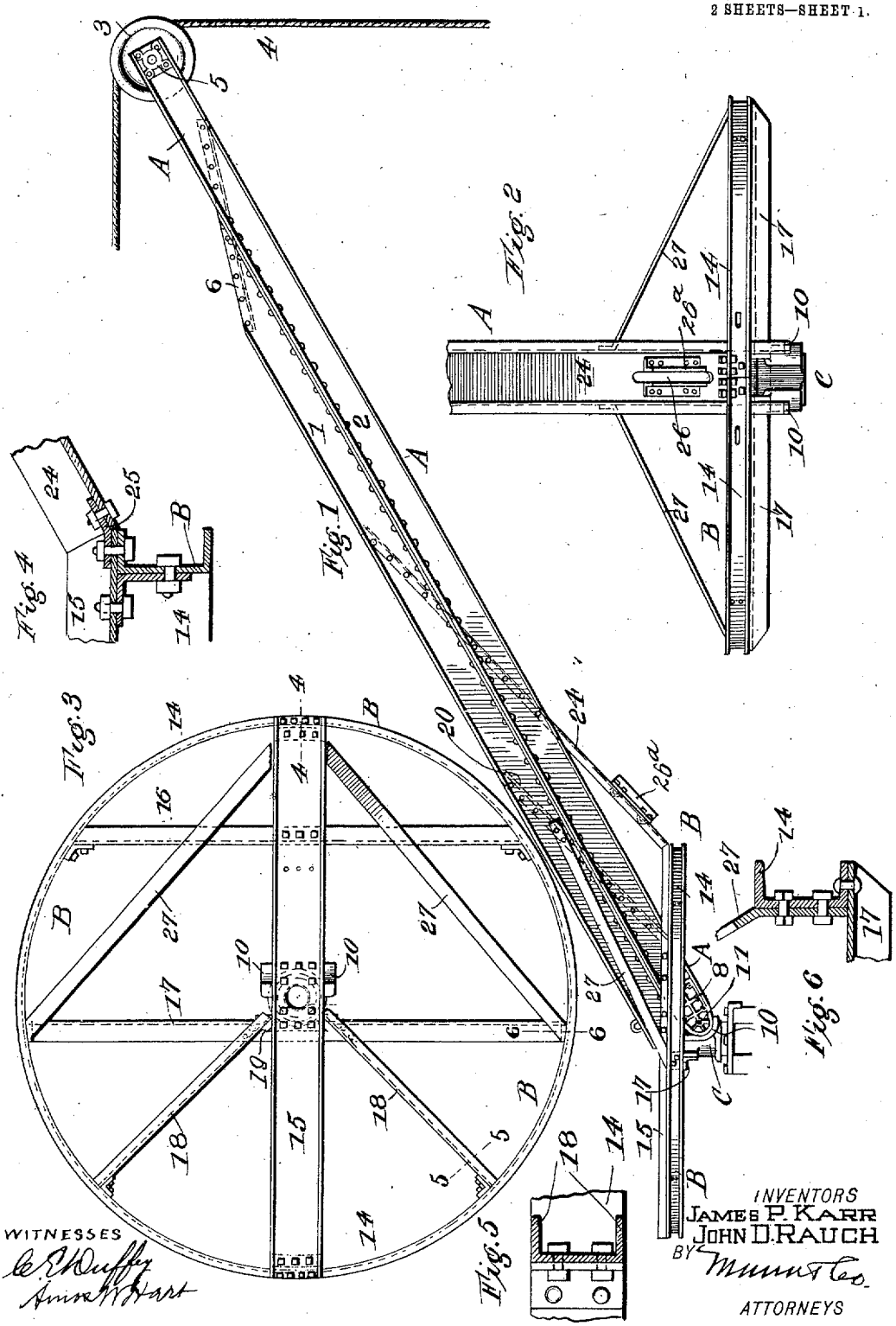
WITNESSES
INVENTORS
JAMES P. KARR
JOHN D. RAUCH
BY
ATTORNEYS

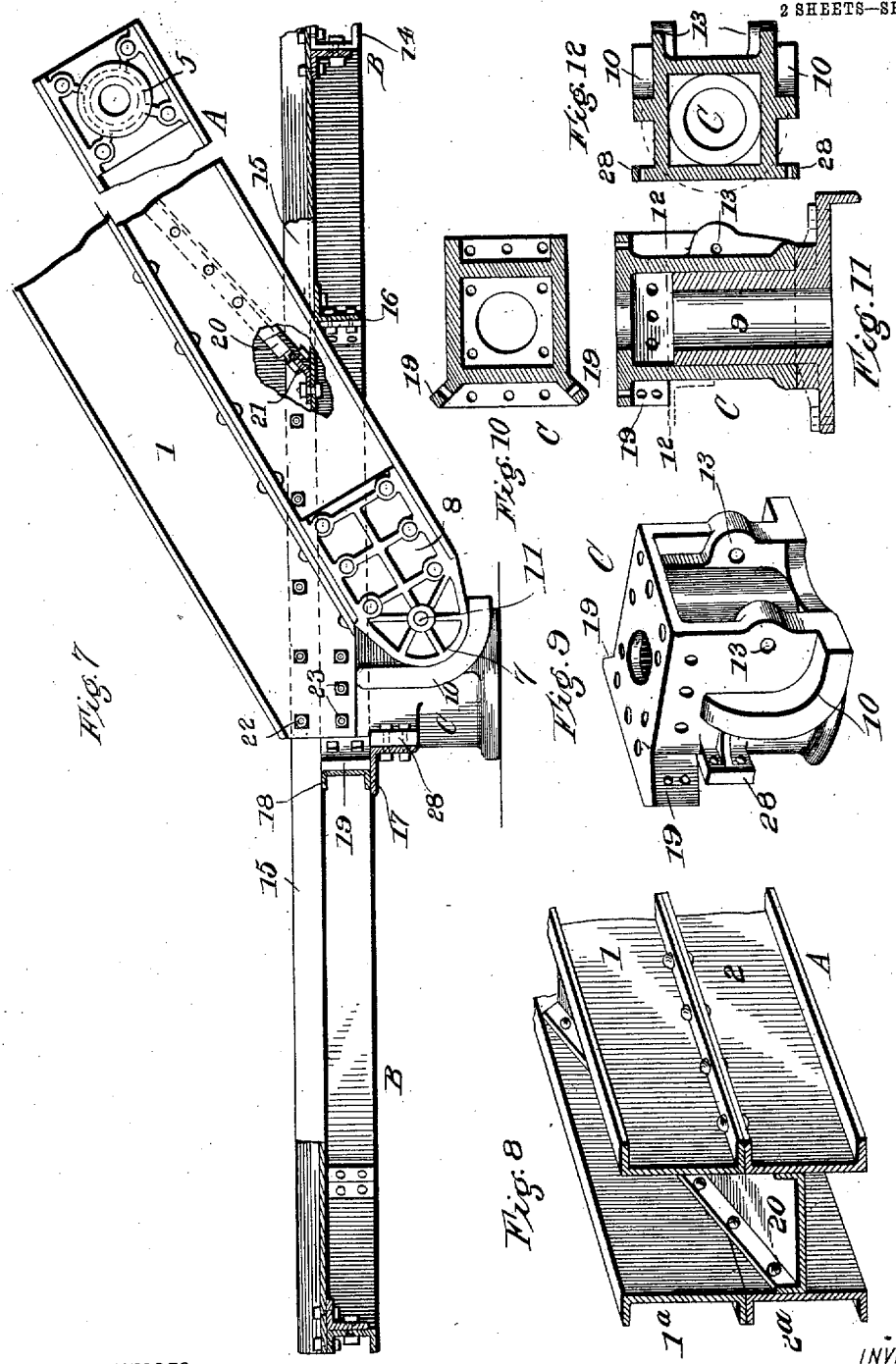

UNITED STATES PATENT OFFICE.

JAMES P. KARR AND JOHN D. RAUCH, OF LOGANSPORT, INDIANA.

BOOM AND ROTATABLE CIRCLE FOR EXCAVATORS.

No. 869,092.      Specification of Letters Patent.      Patented Oct. 22, 1907.

Application filed February 12, 1907. Serial No. 357,015.

*To all whom it may concern:*

Be it known that we, JAMES P. KARR and JOHN D. RAUCH, citizens of the United States, and residents of Logansport, in the county of Cass and State of Indiana, have invented an Improvement in Booms and Rotatable Circles for Excavators, of which the following is a specification.

Our invention is an improvement in booms and rotatable circles of land and marine excavators, such as steam-shovels, dredges, and the like.

The objects sought and attained by our improved construction, arrangement, and combination of parts are maximum strength, rigidity, lightness, and durability.

The details of construction, arrangement, and combination of parts are as hereinafter described and illustrated in the accompanying drawings, in which Figure 1 is a side view of our improved boom and circle. Fig. 2 is a front view showing the rotatable circle and a portion of the under side of the boom connected therewith. Fig. 3 is a plan view of the circle, two of the braces for the boom being shown in section. Fig. 4 is a vertical section on the line 4—4 of Fig. 3, showing the connection between the boom and the circle. Fig. 5 is an enlarged transverse vertical section on the line 5—5 of Fig. 3. Fig. 6 is a similar section on the line 6—6 of Fig. 3. Fig. 7 shows a vertical section of the circle and a side view of the lower portion of the boom and a pivot block to which the boom and circle are attached. Fig. 8 is an enlarged perspective sectional view of a portion of the boom. Fig. 9 is a perspective view of the pivot block to which the base of the boom is attached. Fig. 10 is a horizontal section of the pivot block shown in Fig. 9, the same being taken through the upper portion thereof. Fig. 11 is a vertical section of the pivot block and pivot therefor. Fig. 12 is a horizontal section on the line 12—12 of Fig. 11.

A indicates the boom and B the rotatable circle with which it is rigidly connected and thus adapted to revolve. We construct the boom of four pieces of channel steel 1, 1ª, and 2, 2ª,—see Figs. 1 and 8. Thus two channel pieces 1, 2, are arranged directly opposite two similar pieces 1ª and 2ª, and spaced therefrom throughout their length. All the flanges of the several pieces thus extend outward or laterally, and the upper pieces 1, 1ª, rest directly upon and are riveted to the lower pieces 2, 2ª, as plainly shown in Fig. 8. As indicated in Fig. 1, the upper pieces 1, 1ª, are shorter than the lower pieces 2, 2ª, between whose outer ends the pulley 3 of the hoisting rope 4 is journaled. The bearings for the pulley journals are blocks 5 fitted between the flanges of pieces 2, 2ª, and bolted in place, whereby a strong and durable bearing is produced,—the strength of the same not being entirely dependent upon the rivets or bolts but supported in part by the flanges.

The upper ends of the upper channel pieces 1, 1ª, are scarfed or inclined, and a combined tie and brace 6, formed of channel steel, is arranged in the slot between the four parts of the boom, and riveted thereto, thus forming a very strong, rigid, durable connection. The base 7 of the boom—see Fig. 7—is rounded, and the same is formed of pieces 8 arranged between the flanges of the lower pieces 2, 2ª, and securely bolted thereto.

The pivot block C—see Figs. 9, 10, 11 and 12—is mounted upon a hollow pivot 9 and provided on opposite sides with laterally projecting curved wings or abutments 10—see Figs. 7, 9 and 12—which support the pieces 8 and thereby the boom proper. A bolt 11—see Figs. 7 and 9—passes through the pieces 8 and the holes 13 formed in the body of the pivot block C, and thus secures said pieces thereto. The circle proper B is formed of one or more pieces of channel steel 14, the flanges extending outward as indicated in Figs. 1 and 7. This circle is connected and braced diametrically by another piece of channel steel 15—see Fig. 3. The ends of said piece 15 are bolted upon the top of the circle proper 14, and the middle portion of the same rests upon and is bolted to the flat top of the pivot block C. As shown in Figs. 3, 9, and 11, the channel piece 15 and the pivot block are provided with holes which coincide with the tubular pivot 9, that is in practice bolted to the deck of a dredge or other suitable horizontal support. By this construction we provide for passage of a hoisting or other chain through the pivot post, which is frequently a great convenience in operating the boom.

The circle proper 14 is provided with two ties and braces 16 and 17—see Fig. 3—which are arranged at right angles to the main or diametrical brace 15, and beneath the same, as further indicated in Fig. 7. These parts 16 and 17 are preferably constructed of angle iron, and are bolted not only to the circle 14 but the piece 15, as shown. The circle is further braced by diagonal parts 18—see Fig. 3—the inner ends of the same being bolted to corner wings or flanges 19 of the pivot block C—see Figs. 9 and 10. By this construction we form a very light yet exceedingly strong and rigid circle. The boom A is shown in Fig. 7, extending directly over and resting upon the cross brace 16, but a special feature of our invention, is the arrangement at this point between the four parts of the boom 1, 1ª and 2, 2ª, of a web 20 which as shown in several figures, see particularly Figs. 7 and 8, is arranged diagonally, it being constructed as a channel piece and its flanges riveted to the opposite parts of the boom, while its lower end is connected by a bracket 21 with the diametrical brace 15 of the circle B. Thus the part 20 not only connects and braces the parts of the boom in the lower portion of the latter, but serves also as a strong, rigid connection and support therefor. It will be further seen by observing Fig. 7, that the upper channel pieces 1, 1ª, are extended at the lower end along the sides of the diametrical brace 15 and the pivot block C, and bolted thereto as indicated at 22 and 23, Fig. 7. In Figs. 9 and 11, the holes through which the bolts 23 pass, are indicated. In Fig. 11, it will be noted that there is a space between the top or head of the pivot block C and the top of the hollow pivot 9, which provides space for the heads of bolts 23.

One of the main features of our invention, is the arrangement of a brace 24—see Figs. 1, 2 and 4—which extends between the middle portions of the four parts 1, 1ª, and 2, 2ª, of the boom, and down to the circle B. where it abuts the end of the diametrical or main brace 15—see especially Fig. 4. A bracket or tie piece 25 is bolted to and connects the two parts 15 and 24. Thus, again, the boom proper is strengthened and its several parts firmly connected by the brace 24, while the latter subserves a still more important purpose in supporting the boom upon the circle as well as further connecting it rigidly therewith. As shown in Figs. 1 and 2, a slot 26 is formed in the brace 24 adjacent to the circle B, and short pieces of channel iron 26ª are arranged on opposite sides to form guides for a rope or chain that may be passed through the slot and attached to the shovel or dipper not shown, for use in hauling the same inward when required to adjust it for taking a load. On each side of the lower portion of the boom, we provide diagonal or inclined braces 27—see Figs. 1, 2 and 3—the outer ends of the same extending to the sides of the circle proper 14, where the ends of the transverse brace 17 are attached. The middle portion of this brace 17 is attached to lateral wings or flanges 28—see Figs. 1, 7 and 9—which are formed integral with the body of the pivot block C.

It will be seen that the several inclined braces 6, 20, and 24, serve, in addition to their function as braces proper, as fillers or means for holding the side portions of the boom rigidly spaced apart.

We claim:

1. The improved boom formed of four pieces of channel steel, the same being arranged in pairs opposite each other, the several flanges of the same projecting outward, and the inner flanges being riveted together, substantially as described.

2. The improved boom for the purpose specified, comprising four pieces of channel steel, the same being arranged in pairs and spaced apart, and the several flanges projecting laterally, the inner flanges of each pair resting in contact and being riveted together, and filling pieces and braces of channel steel arranged between the pieces forming the boom proper, and the flanges of the same being riveted to the boom, substantially as described.

3. The improved boom for the purpose specified, comprising four pieces of channel steel, the same being arranged in pairs, the flanges projecting outward, and the adjacent flanges of each pair being riveted together, the upper pieces of the boom being shorter than the under ones, and a flanged filling piece and tie 6 arranged diagonally between them and bolted to them as shown and described.

4. The combination, with the rotatable circle, having a body portion and a diametrical brace, and a pivoted block, of a boom attached to such pivot block, and a diagonal brace and filling piece 24 extending between the portions of the boom and connected at its lower end with the front end of said diametrical brace at the point where it joins the circle proper, as shown and described.

5. The combination with the pivot block and a rotatable circle attached thereto, and having a diametrical brace, of a boom connected with the pivot block and having a brace extended downward on the under side and rigidly connected with the diametrical brace, as shown and described.

6. The combination with a pivot block having lateral projections, and a circle attached to said pivot block, of a boom whose lower end abuts and rests upon the said projections, and means for securing it to the pivot block, as shown and described.

7. The combination with a pivot block and circle, rigidly attached thereto and having a diametrical brace, of a boom composed of four pieces of channel steel whose flanges project outward, the adjacent ones being riveted together, the upper pieces of the boom being extended on the sides of the diametrical brace of the circle and secured thereto and to the pivot block, substantially as described.

8. The combination with a pivot block, having lateral projections or abutments, a circle rigidly attached thereto so as to rotate therewith, of a boom whose lower end rests on said abutments, a bolt securing the same to the pivot block, diagonal braces attached to the circle proper and the body of the boom, and a brace 24 extending downward from the body of the boom and rigidly connected with the circle, substantially as described.

9. The combination with a pivot block, and a circle which is attached thereto, and including a diametrical brace 15, of the boom extending down through the circle, and abutting on and secured to the pivot block, and a combined brace and filling piece 20 formed of channel steel and arranged between the opposite portions of the boom proper, its lower end extending down to and being rigidly secured upon the circle brace 15, as shown and described.

10. The combination with a pivot block, a circle attached thereto, and having a diametrical brace, of a boom extended down and secured to the pivot block and formed of four channel steel pieces, whose flanges extend outward, the adjacent ones being riveted together, the upper channel pieces being extended alongside, and bolted to, the diametrical circle brace, and a combined filling piece and brace 20 arranged between the opposite portions of the boom proper and extended downward and rigidly connected with the circle brace, substantially as described.

JAMES P. KARR.
JOHN D. RAUCH.

Witnesses:
FRANK P. WILKINSON,
HARRY C. KERLING.